Figure 1:
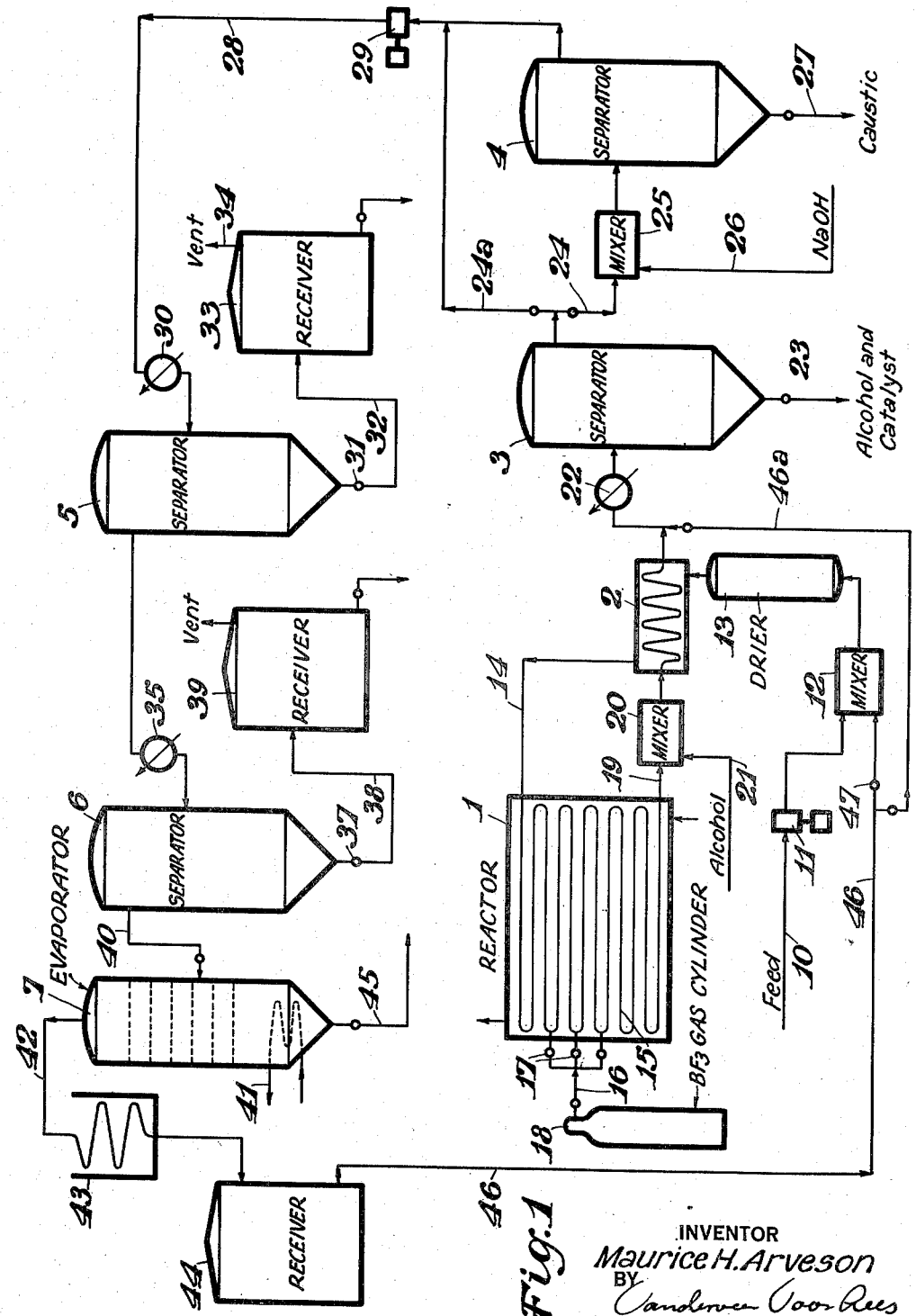

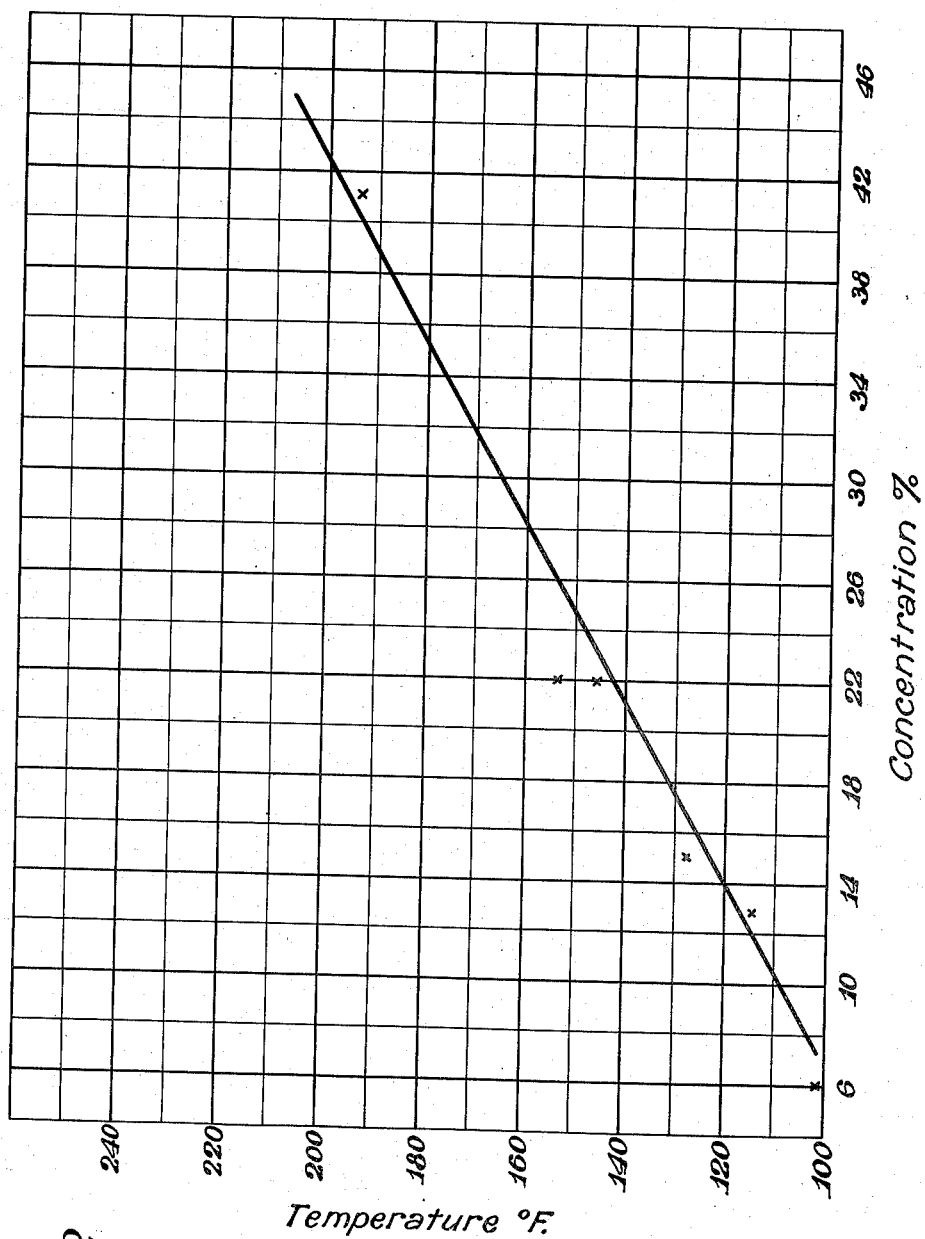

Patented Aug. 9, 1938

2,125,872

UNITED STATES PATENT OFFICE 2,125,872

HYDROCARBON RESIN PROCESS

Maurice H. Arveson, Chicago, Ill., assignor to Standard Oil Company, Chicago, Ill., a corporation of Indiana Application March 9, 1937, Serial No. 129,803

9 Claims. (Cl. 260—2)

This invention relates to a process of manufacturing hydrocarbon resins and more particularly to the manufacture of hydrocarbon resins by the catalytic polymerization of liquid isobutylene at low temperatures. One of the objects of the invention is to produce at the same time both solid and semi-solid resins, i. e., resins with varying degree of softness. Another object of the invention is to produce an oil-free synthetic hydrocarbon resin. Still another object of the invention is to facilitate the handling of the hydrocarbon resins obtained by the polymerization of isobutylene at low temperatures. Other objects will be observed from the following description.

The accompanying drawings which form a part of this specification illustrate the manner in which it may be carried out. Figure 1 shows a suitable apparatus in partly diagrammatic form and Figure 2 is a graph showing the relationship of the conditions to be observed.

Referring to Figure 1 of the drawings, 1 is a reactor comprising a coil submerged in a suitable refrigerant; 2 is a heat exchanger; 3, 4, 5 and 6 are separating chambers and 7 is an evaporator.

The process may be conducted as follows: a solution of isobutylene, isobutane, normal butane and butylene which may suitably contain from 10-25% of isobutylene, is introduced by line 10 and feed pump 11 through mixer 12 and drying tower 13 to heat enchanger 2 where it is cooled to a temperature which may suitably be 0-20° F. The cooled liquid is conducted by line 14 to reactor 1 where it flows through coil 15 surrounded by a suitable refrigerant, for example liquid ammonia, liquid propane, liquid ethane or ethylene, etc. Other refrigerants such as a slurry of solid $CO_2$ in acetone may be employed.

When the isobutylene feed stock has been cooled to the desired temperature, for example below 0° F., in coil 15 a catalyst of the active metal halide type is introduced by line 16 controlled by valves 17. Active metal halides are those which hydrolyze readily in water to form halogen acid. This catalyst may be boron trifluoride introduced as a gas from cylinder 18 or it may be aluminum chloride dissolved or dispersed in nitrobenzene or other suitable solvent. Other active halide catalysts may be employed, for example titanium tetrachloride, phosphorous chlorides, tin tetrachloride, antimony trichloride, etc., either alone or in mixtures with each other. The amount of catalyst required is usually not over 2% by weight of the hydrocarbon treated, and generally from 0.1 to 1% is used.

After introducing the catalyst, the isobutylene feed stock is maintained at the low temperature desired, for example −40 to −100° C. and sufficient time permitted for the polymerization of isobutylene to take place. Heat evolved during the polymerization is absorbed by the refrigerant which surrounds the coil 15. After the polymerization is complete the product leaves the reaction chamber by line 19 and passes to mixer 20 where a small amount of alcohol, for example 95% ethyl alcohol, is introduced by line 21 for the purpose of arresting further catalytic action. Under some conditions it may be desirable to arrest the reaction before completion in order to obtain a heavier polymer product.

The reaction product then passes through heat exchanger 2 where it serves to refrigerate the incoming feed stock from drier 13. From the heat exchanger it passes through a heater 22 where it is suitably warmed up to room temperature before discharging into separator drum 3. The alcohol and catalyst dissolved therein is withdrawn from the separator by valved line 23, and the polymerized isobutylene, in solution in butane, is conducted by line 24 to mixer 25 where it is neutralized with a solution of sodium hydroxide introduced by line 26. The reaction product is then passed into caustic settler 4 whence the caustic solution is withdrawn by line 27. Where a sufficient separation of catalyst is obtained by the alcohol treatment in separator 3, the neutralizing treatment may be omitted and the product conducted by valved by-pass line 24a directly to pump 29.

The product is now conducted by line 28 and pump 29 to heater 30 which may be heated by indirect steam coils. Flowing through heater 30 the temperature of the stock is raised to a point where a considerable fraction of the isobutylene polymerization product is caused to separate from the solution. The product is conducted into separator 5 where a heavier solid fraction of the polymer is allowed to settle and withdrawn by valve 31 and line 32 leading to vented receiver 33. Some butane which remains dissolved in the heavy fraction is evaporated by heat and/or vacuum and is discharged from the receiver through vent 34. A satisfactory time of settling in separator 5 is ten minutes for each foot of distance through which the resin must settle. In place of gravity separators I may use centrifugal means for hastening separation.

The upper layer of the solution in separator 5 is conducted through heater 35 where it is heated to a still higher temperature and discharged into separator 6. Here a second fraction of resin which is softer than the first is separated from the solution and withdrawn by valve 37 and line 38 to vented receiver 39.

The solution remaining as an upper layer in separator 6 is conducted through valved line 40 to evaporator 7 provided with heating coil 41 and suitable baffle plates to permit evaporation of the unreacted butanes and butylene, the vapors of which are discharged through line 42 leading to condenser 43 and receiver 44. The oily residue unevaporated in evaporator 7 is withdrawn continuously or intermittently through valved line 45.

A portion of the recovered butanes may be continuously withdrawn from receiver 44 and conducted by line 46 controlled by valve 47 and leading to mixer 12 whence it is recycled in the system. The amount of butane recycled may be controlled to maintain a constant concentration of isobutylene in the feed stock charged to the reactor 1, thus preventing difficulties in the subsequent high temperature separation of fractions which would otherwise result from sudden changes in the concentration of the feed stock supplied to line 10. Where pure isobutylene is available as feed, any desired concentration may be employed in this manner. Instead of recycling butanes to line 10 I may conduct them through line 46a to the stream leaving the heat exchanger 2, if desired.

In one example I charged to the process a solution of isobutylene in butanes and normal butylenes together with about 1% of pentane. The stock was cooled to −80° F. and BF₃ was introduced with agitation, after which one hour was permitted for the reaction to be completed. The resulting product was washed with a solution of 50% alcohol in water at −20° F. and after separating the alcohol the product was heated to 210° F. where separation of polymer resin began and was substantially complete at 220° F. Evaporation of the remaining solution left a heavy oily liquid.

In another operation eighty parts by weight of an isobutylene solution was polymerized in the same manner and the resulting product was heated under pressure to 213° F., the pressure being about 225 pounds per square inch gage. After settling, the precipitated layer was withdrawn from the separator, dissolved butane was released from it and a heavy solid fraction was obtained. An intermediate layer of incompletely separated material was withdrawn and the remaining solution was evaporated, leaving a heavy oil. These products were tested for their effectiveness in increasing the viscosity index of lubricating oil by adding 2% of each to a base oil having a viscosity of 162 seconds Saybolt at 100° F. and a viscosity index (Dean and Davis) of 100. The heavy solid fraction raised the viscosity index to 116 whereas the heavy oil obtained by evaporation had almost no effect on the viscosity index, raising it only one point. The original product from the reaction without separation increased the viscosity index to 112.

In general it is preferred to remove the catalyst from the reaction mixture before heating and separation of resin, but this step may be omitted, in which case the catalyst may be subsequently recovered and reused.

As another illustration of the difference in the character of the resin fractions obtained in my process, the data in the following table are typical. The character of the resin fractions is indicated by the viscosity and viscosity index values obtainable with a 2% solution of the resin fraction in the base oil.

|  | Base oil | Base oil plus 2% of resin | | |
|---|---|---|---|---|
|  |  | 1st fraction (heavy) | 2nd fraction (intermediate) | 3rd fraction (light) |
| Saybolt viscosity at 210° F | 44.3 | 64.9 | 48.1 | 46.1 |
| Saybolt viscosity at 100° F | 162 | 382 | 207 | 187 |
| Viscosity index | 100 | 128 | 112 | 105 |

In carrying out my process of making viscous hydrocarbon resins from liquefied gaseous hydrocarbons in the range of the butanes, and recovering successive fractions of the resin from the unreacted hydrocarbons, I find that the concentration of the resin product in the unchanged hydrocarbons has a considerable influence on the temperature of separation. Thus, a feed stock containing only 10% of isobutylene will give a product, on polymerization, which will begin to deposit heavy resin product when heated to a considerably lower temperature than is the case with a feed stock containing 30 to 40% of isobutylene. This relationship is shown graphically in Figure 2 where the temperature of initial separation is plotted against the concentration of resin in the reaction product.

From this graph it will be seen that a product containing only 6% of resin will begin to separate when heated to 102° F., whereas a product containing 41% resin will begin to separate at 194° F. At the higher concentrations, the separation likewise becomes sharper, i. e., it takes place over a narrower temperature range than at the lower concentration. Thus at 41% concentration, separation began at 194° F. and 80% of the resin had separated at 200° F., leaving in solution only the very soft resin and by-product oily polymer. As a consequence, close temperature and concentration control is required to effect the desired fractional separation of the products.

Referring again to Fig. 2, it will be seen that the experimentally determined points on the graph fall closely on a straight line, the equation of which has been calculated to be $$T = 80.5 + 2.83C$$

where "T" is the temperature in degrees Fahrenheit and "C" is the concentration of resin in percent by weight of the reaction product solution. In general, the temperature of the first resin separator should be controlled to fall just above this line, the degree depending on the amount of product desired in the first fraction. The temperatures of succeeding separators should be higher.

As ordinarily conducted, the temperature of the first separator will fall within the range of 5° below the line to 10° above it, and succeeding separators will be about 5° to 15° warmer. Somewhat lower temperatures are required in the case of resins made by polymerization at very low temperatures, e. g., below −100° F.

The resins produced by my process are solid and semi-solid, plastic hydrocarbons which are characterized by great chemical inactivity, and resistance to change of viscosity with temperature. They are colorless or may easily be made so by simple treatment with fuller's earth and they retain their plasticity over a wide range of temperature. At elevated temperature, above 400° F., they suffer molecular decomposition.

They are useful in compounding oils, greases, rubber, etc. and for many other uses where an oil soluble, permanently plastic, inert hydrocarbon resin is needed.

Although I have described my process by its application to certain specific procedures, I intend that the scope of my invention be not limited thereby but only as set forth in the following claims. Thus I may employ hydrocarbon solutions of isobutylene containing less than 10% and even as low as 5%. Also solutions of greater concentration than 25% may be used, for example, I may use solutions of 40–45% concentration, although I prefer to use concentrations in the range of 10 to 25%, the remaining hydrocarbons being substantially butanes and normal butylenes.

I claim:

1. In the manufacture of hydrocarbon resins wherein liquid isobutylene is polymerized by the catalytic action of an active metal halide in the presence of from 55–95% of butanes and normal butylenes at temperatures below 0° F., the improvement comprising heating the reaction product in the presence of the said butanes and normal butylenes to a temperature in the range of 190 to 210° F. where the desired heavy polymer fraction is caused to separate and thereafter recovering a remaining lighter polymer fraction from the solution by evaporation.

2. The process of claim 1 wherein the solution of the reaction product is heated to a higher temperature after removing the first desired heavy resin fraction and a second lighter resin fraction is separated in the same manner.

3. The process of claim 1 wherein the polymerization product is treated with alcohol to remove the catalyst before the said heating step.

4. The process of claim 1 wherein a portion of the unreacted butane-butylene hydrocarbons recovered in the evaporation is introduced into the feed stock in continuously regulated quantities to maintain a constant desired concentration of isobutylene therein.

5. The process of making synthetic hydrocarbon resins of varying degrees of plasticity from isobutylene which comprises polymerizing a solution of isobutylene in about 75 to 90% of liquid butanes and normal butylenes by the catalytic action of an active metal halide at a temperature below −40° F., heating the reaction product to a separation temperature without substantial evaporation, separating a heavy insoluble resin polymer fraction from the hydrocarbon liquid and subsequently separating the unreacted hydrocarbons from the remaining hydrocarbon polymers.

6. The process of claim 5 wherein the active metal halide catalyst is boron fluoride.

7. The process of claim 5 wherein said separation temperature is determined from the concentration of the resin in the reaction product in accordance with the following relation:

$$T = 80.5 + 2.83C$$

where "T" is the temperature in degrees F. and "C" is the concentration of said resin in percent by weight and conducting the separation of said heavy insoluble resin polymer fraction at the separation temperature thus determined.

8. In the process of manufacturing plastic resins by the catalytic polymerization, at low temperatures, of liquid isobutylene contained in an inert butane solvent wherein polymers are produced having a wide range of molecular weights dissolved in said inert solvent, the improvement comprising fractionally precipitating said resin from solution in said solvent by heating said solution under pressure to an elevated temperature of about 194–220° F. and separating the precipitated resin fractions from said solution of unprecipitated fractions of said resin.

9. The process of claim 8 wherein the said elevated temperature to which said solution is heated is determined from the concentration of the resin in accordance with the following equation:

$$T = 80.5 + 2.83C$$

where "T" is the temperature in degrees Fahrenheit and "C" is the concentration of said resin in percent by weight.

MAURICE H. ARVESON.